United States Patent [19]
Carlson et al.

[11] Patent Number: 6,151,196
[45] Date of Patent: Nov. 21, 2000

[54] MAGNETIC HEAD SUSPENSION ASSEMBLY INCLUDING AN INTERMEDIATE FLEXIBLE MEMBER THAT SUPPORTS AN AIR BEARING SLIDER WITH A MAGNETIC TRANSDUCER FOR TESTING

[75] Inventors: Carl J. Carlson, Pleasanton; Daniel P. Schott, San Jose, both of Calif.

[73] Assignee: Read-Rite Corporation, Milpitas, Calif.

[21] Appl. No.: 09/250,894

[22] Filed: Feb. 16, 1999

[51] Int. Cl.[7] ........................................................ G11B 5/48
[52] U.S. Cl. ...................................... 360/245.9; 360/245.2
[58] Field of Search ................................ 360/104, 244.2, 360/245, 245.3, 245.4, 245.2, 245.9

[56] References Cited

U.S. PATENT DOCUMENTS

| | | | |
|---|---|---|---|
| 5,924,187 | 7/1999 | Matz | 360/104 |
| 5,933,293 | 8/1999 | Bennin | 360/104 |
| 6,046,887 | 4/2000 | Uozumi et al. | 360/104 |
| 6,057,986 | 8/1999 | Takasugi | 360/104 |

*Primary Examiner*—Jefferson Evans
*Attorney, Agent, or Firm*—Nathan N. Kallman

[57] ABSTRACT

A method of making a magnetic head suspension assembly includes attaching a slider with a magnetic head to an intermediate flexible circuit. The attached combination is then inserted into a spin stand tester for the testing of electrical performance. If the attached combination fails the test, it is discarded, thereby avoiding the cost of discarding an entire head suspension assembly. On the other hand, if the attached combination passes the test, it is mounted to a load beam to form the head suspension assembly. Thereafter, a flex circuit can be attached to the load beam and intermediate flexible circuit to provide electrical connections to the magnetic head through the intermediate flexible circuit.

3 Claims, 8 Drawing Sheets

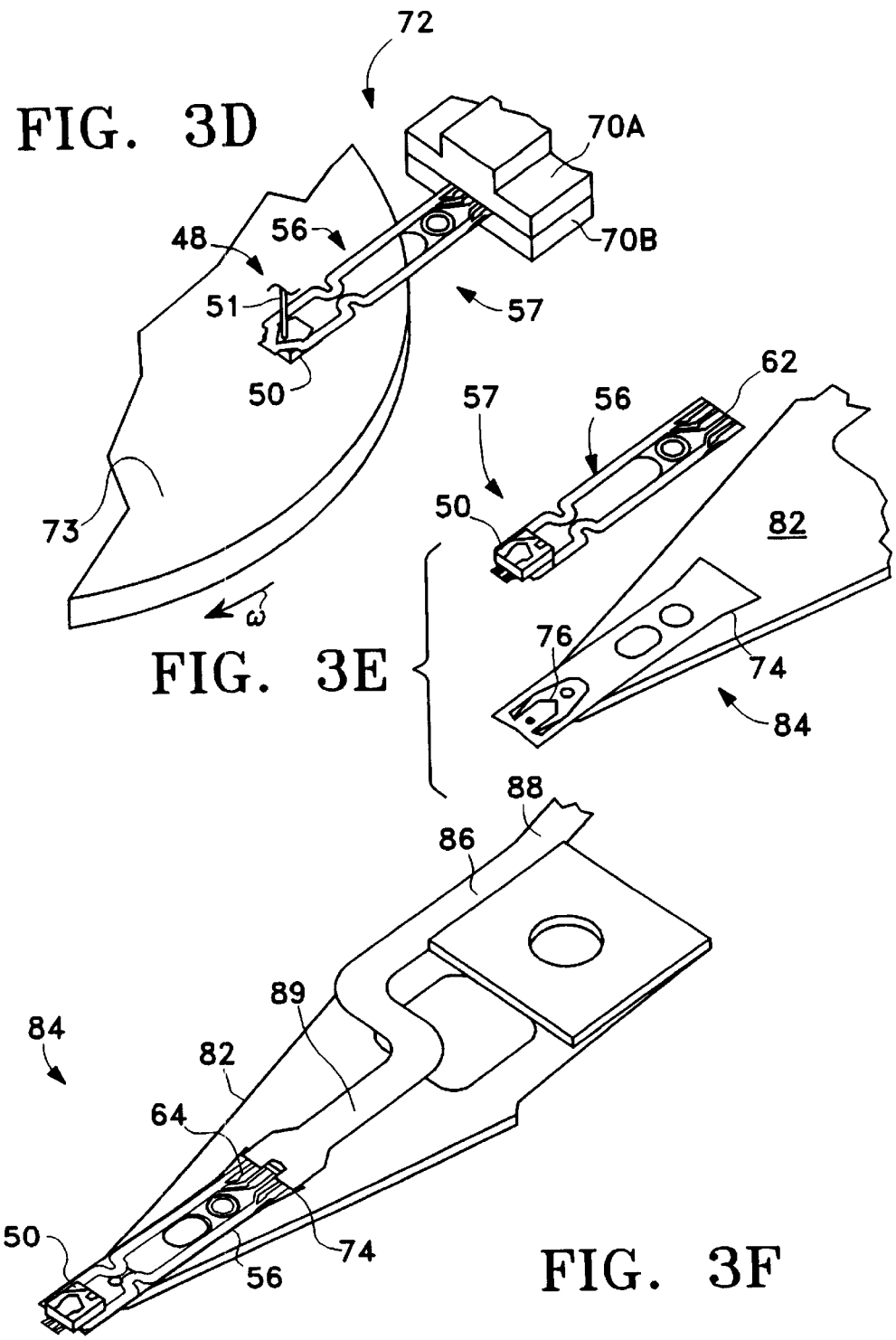

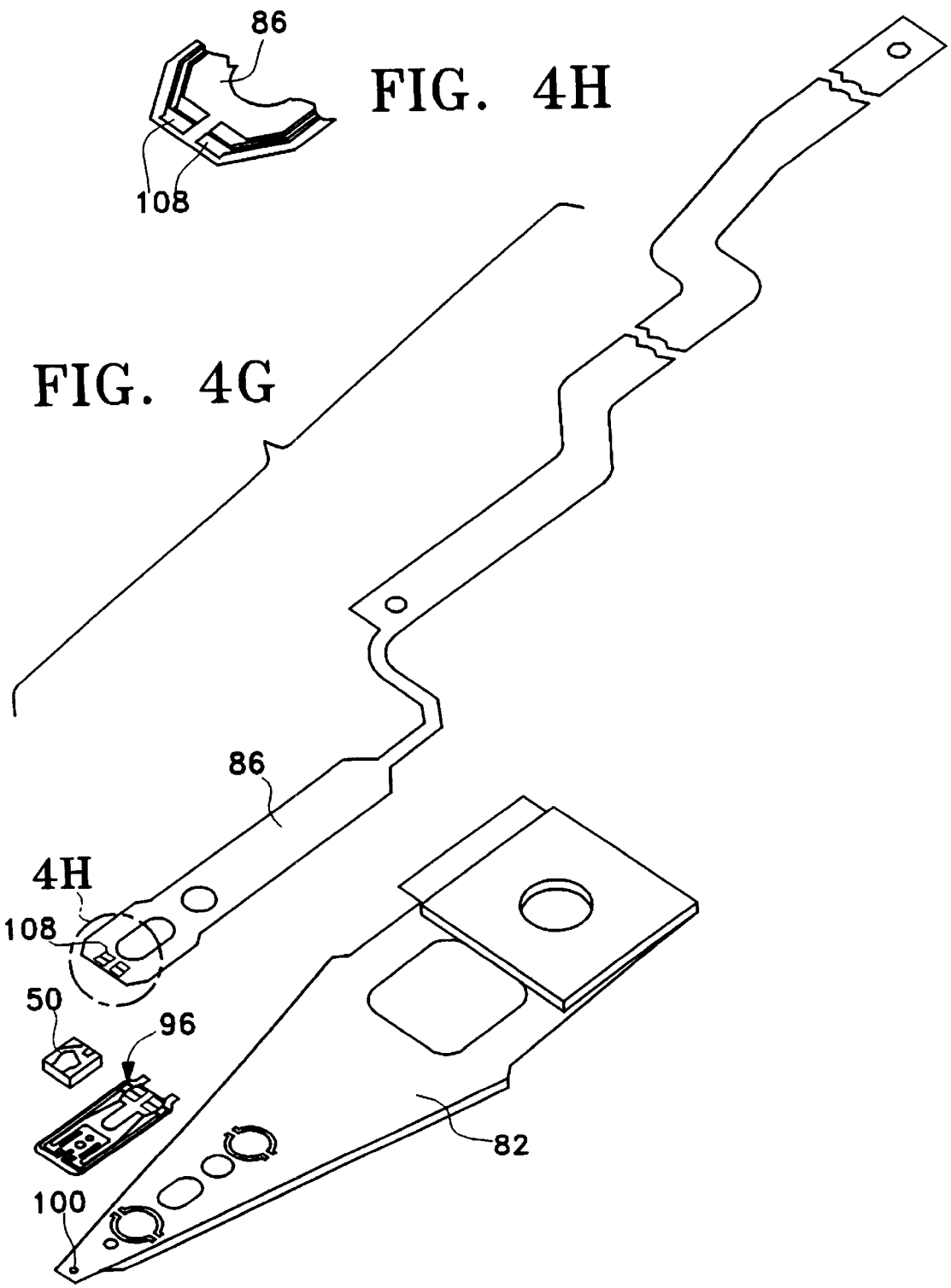

MAGNETIC HEAD SUSPENSION ASSEMBLY INCLUDING AN INTERMEDIATE FLEXIBLE MEMBER THAT SUPPORTS AN AIR BEARING SLIDER WITH A MAGNETIC TRANSDUCER FOR TESTING

FIELD OF HE INVENTION

This invention relates to fabrication and testing of magnetic head suspension assemblies.

BACKGROUND OF THE INVENTION

FIG. 1 shows a fragmentary view of a prior art disk drive having an actuator arm assembly 2 and a stack of spaced apart disks 4 rotatable about a common spindle 5 as represented by the arrow 20. The actuator arm assembly 2 is also rotatable about an actuator arm axis 6. The arm assembly 2 includes a plurality of actuator arms 8A–8C which extend into the spaces between the disks 4A and 4B. Attached to each of the actuator arms 8A–8C is a magnetic head suspension assembly 10, which comprises a resilient load beam 12, a flexure 14 and a slider 16. Each load beam 12 is attached to one of the actuator arms 8A–8C via a base plate 25 having a boss 40 snugly inserted into the actuator hole 42 as shown in FIG. 1.

FIG. 2 shows the magnetic head suspension assembly 10 in further detail. The load beam 12 is made of resilient material which is slightly bent toward the disk surface 18 (FIG. 1). Underneath the distal end of the load beam 12 is the flexure 14. An alignment hole 33 in the load beam 12 is provided for the alignment of the corresponding hole in the flexure 14, thereby orienting the flexure 14 in a proper location. The flexure 14 is fixedly attached onto the load beam 12 in the area surrounding the alignment hole 33 via welding.

The flexure 14 has an integrally formed tongue portion 26. Fixedly attached to the tongue portion 26 is the slider 16. Stamped at the end of the load beam 12 is a dimple 28 which is urged against the tongue portion 26 of the flexure 14. The dimple 28 acts as the fulcrum for the resilient flexure 14 to provide gimbaling action. At the edge of the slider 16 is a magnetic head transducer 24. Electrical signals written in or read out of the transducer 24 are conducted by wires 30 disposed on the load beam 12 and guided by one of the load beam ribs 32A. As an alternative, a flex circuit 34 is used in lieu of the wires 30. Instead, electrical signals are sent or received through the traces 36 (shown partially as a representation in phantom) embedded on the flex substrate 38 of the flex circuit 34.

The topology of the disk surface 18, though highly polished, is not at all uniform at microscopic scale. Very often, the disks 4A and 4B are not rotating about the spindle at a perfectly perpendicular angle. A minute angular deviation would translate into varying disk-to-slider distances while the disks 4A and 4B are spinning. For reliable data writing and reading, the slider 16 thus has to faithfully follow the topology of the spinning disks 4A and 4B, without ever contacting the disk surfaces 18. The head gimbal assembly 22 is employed to accommodate the disk surface topology. Basically, the gimbal assembly 22 is designed to dynamically adjust the position of the slider 16 to conform to the irregular disk surface 18 while the disk is spinning. To meet this end, the flexure inside the gimbal assembly 22 must be sufficiently flexible and agile on one hand, yet stiff enough to resist physical deformation on the other hand.

The magnetic suspension assembly 10, which includes the slider 16, the flexure 14, the load beam 12, the baseplate 25, and either the wires 30 or the flex circuit 34, needs to be tested prior to installation to a disk drive. Heretofore, testing of the magnetic head suspension assembly 10 involved inserting the entire assembly 10 into the arm of a spin station which performs the tests. Of all the constituent parts of the suspension assembly 10, the transducer 24 is the most delicately fabricated component. Often, the failure of the assembly 10 is the electrical malfunctioning of the transducer 24. Since the magnetic head suspension assembly 10 is permanently attached, the entire assembly 10 has to be rejected as a consequence.

The technological trend in disk drive manufacturing is toward miniaturization. As a consequence, sliders are reduced in size. A fixed area of a wafer can now yield more sliders than in the past. Accordingly, costs for each slider fabricated with the transducer 24 decrease. Instead, a greater portion of the manufacturing cost shifts to the other components of the assembly 10. Thus, rejecting the entire assembly 10 which includes the base plate 25, the load beam 12, the flexure 14 and the flex circuit 34 is wasteful and unnecessarily increases manufacturing costs.

There is also a trend toward new designs which include active integrated circuits (not shown) disposed near the transducer 24. For example, integrated circuits may be placed on the flex circuit 34 or the load beam 12. Weak signals picked up by the transducer are immediately amplified by the integrated circuits before the next stage of signal amplification during data reading, for instance. Placing the active circuits close to transducer 24 substantially improves the signal-to-noise ratio (SNR) of the magnetic head assembly 10. Adopting the prior art approach of testing and manufacturing of the assembly 10 would further aggravate the situation and is even more wasteful because the active circuits also need to be discarded in the event of test failure. Accordingly, there has been a long-felt need for building magnetic head suspension assemblies without the aforementioned problems.

SUMMARY OF THE INVENTION

It is an object of the invention to provide a method of prescreening defective components prior to final assembly in the manufacturing of magnetic head suspension assemblies, thereby improving production yield and reducing manufacturing costs.

In accordance with the invention, a slider is fabricated with a magnetic head transducer and then attached to an intermediate flexible circuit. The combination is thereafter inserted into a spin stand tester for the testing of various electrical parameters. If the attached combination fails the test, it is discarded. On the other hand, if the attached combination passes the test, it is mounted onto a load beam to form the magnetic head suspension assembly. In one embodiment, the intermediate flexible circuit affixed with the slider is attached to a load beam having a flexure. In another embodiment, the intermediate flexible circuit is attached to a load beam having no pre-disposed flexure, wherein the intermediate flexible circuit acts as the flexure in the final assembly.

Accordingly, the magnetic heads, which normally experience the highest failure rate, are isolated and rejected prior to final assembly, without affecting the associated components which are more expensive.

BRIEF DESCRIPTION OF THE DRAWINGS

FIG. 3A–3F are sequential views showing the steps of testing and fabricating the magnetic head suspension assembly in accordance with a first method of the invention;

FIG. 4G is an exploded view showing the relationship of the various components of the magnetic head suspension assembly fabricated in accordance with the method shown in FIGS. 4A–4F; and FIG. 4H is an enlarged view of the distal end of the flex circuit revealing the bonding tabs.

DETAILED DESCRIPTION OF THE INVENTION

Reference is now directed to FIGS. 3A–3F which shows the method of manufacturing and testing a magnetic suspension assembly in accordance with the invention.

The inventive process starts with providing a slider 50 having a magnetic head transducer 52 formed thereon. The magnetic head transducer 52 can be embedded within the slider 50. For example, a relatively thick layer of alumina ($Al_2O_3$) can be coated onto the trailing surface 54 of the slider 50. The magnetic head transducer 52 can be an inductive head, an anistropic magnetoresistive head (AMR), a giant magnetoresistive head (GMR), or a combination thereof as a merged head. There is also a plurality of bonding pads 55 deposited on the trailing surface 54 of the slider 50.

Figure 1:
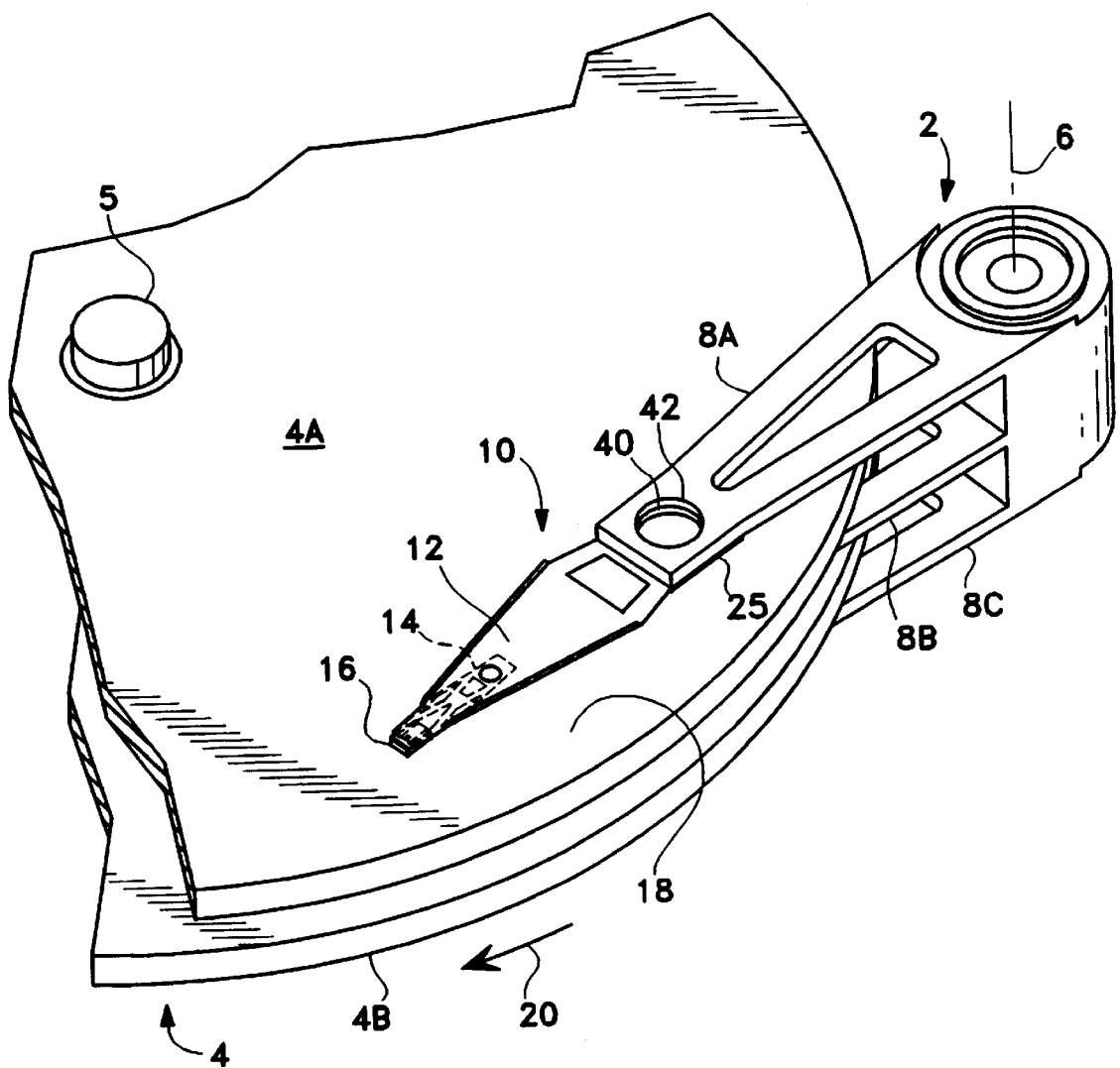
FIG. 1, as described above, is a fragmentary view of a disk drive having a known magnetic head suspension assembly interacting with a plurality of disks.
Figure 2:
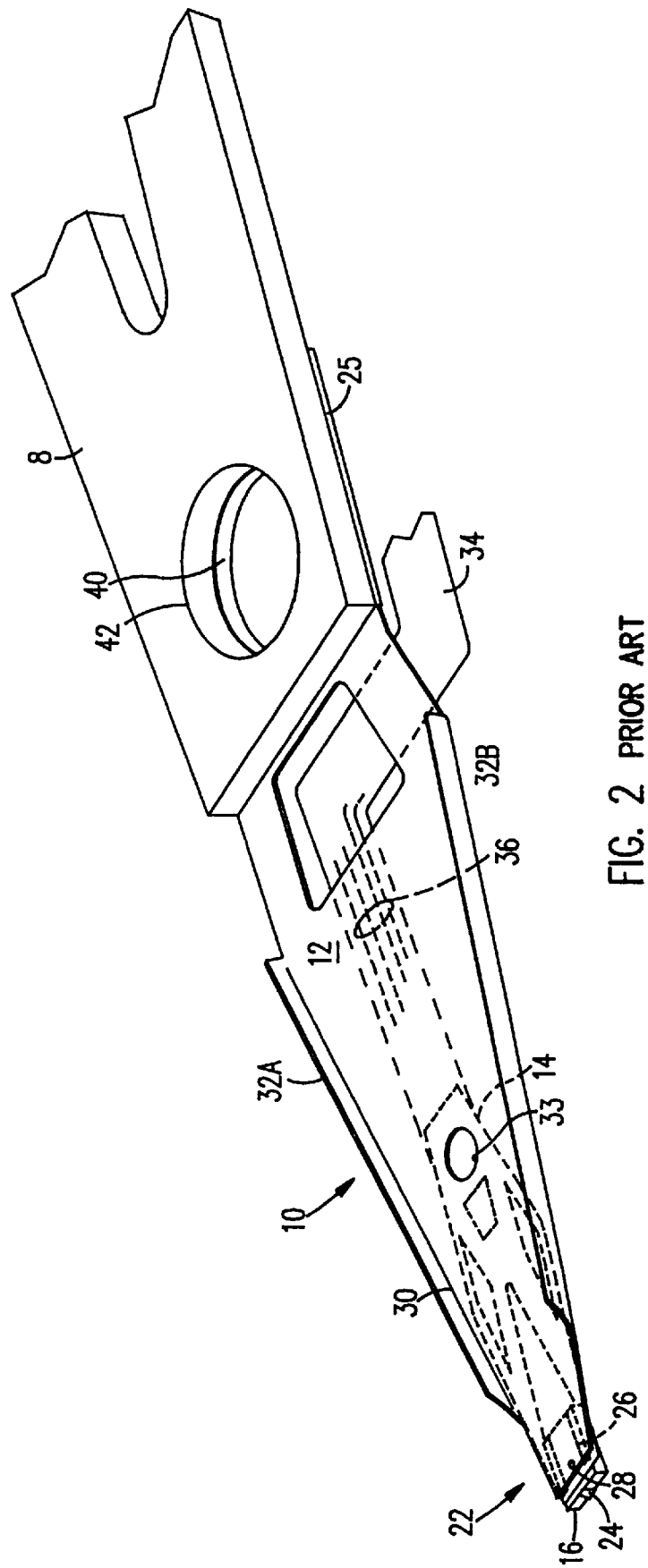
FIG. 2, as described above, is an enlarged perspective view of the known magnetic head suspension assembly attached to an actuator arm.
Figure 3A:
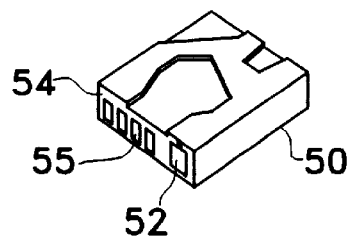
Figure 3B:
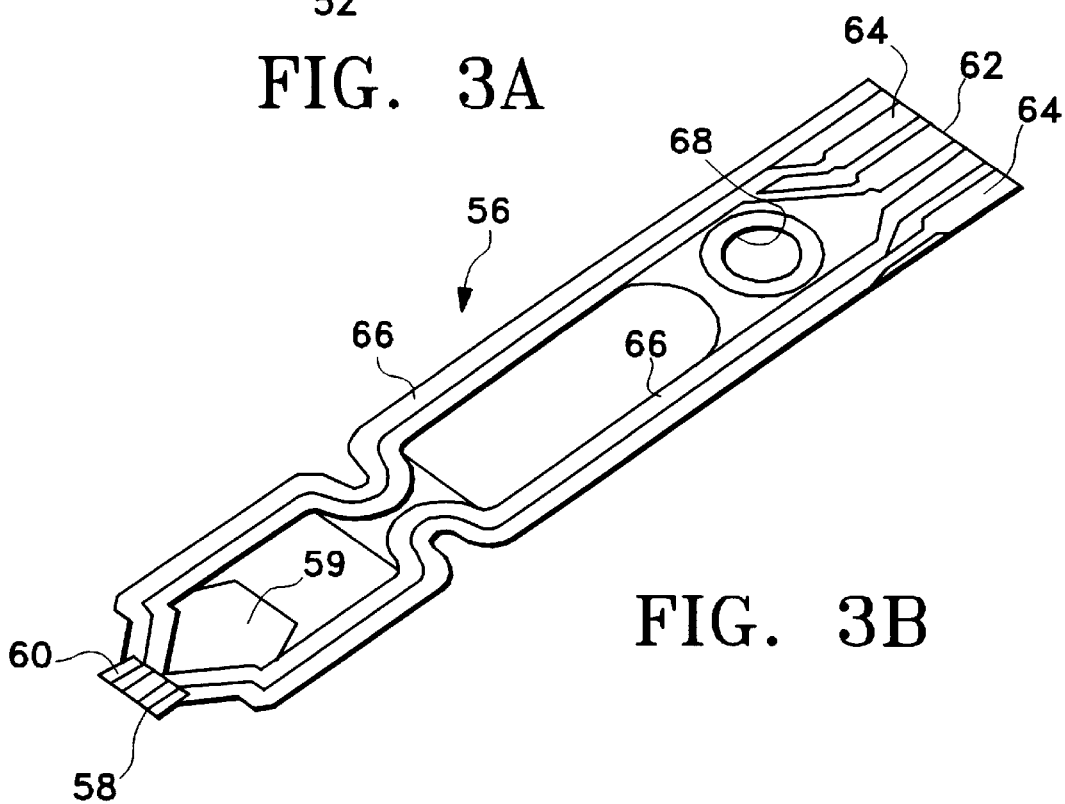

Next, a flexible interconnect flexible member 56 is provided as shown in FIG. 3B. Preferably, the flexible member 56 is made of a flexible material such as polyimide. Formed on the flexible member 56 at the distal end 58 is an electrical footprint 60 for receiving the slider 50. Formed on the flexible member 56 at the proximal end 62 is a plurality of signal pads 64. The electrical footprint 60 and the signal pads 64 are electrically connected through electrical traces 66 formed on the sides of the flexible member 56. Extended beyond the electrical footprint 60 is a tongue portion 59 for attaching the slider 50. There is also an alignment hole 68 formed on the flexible member 56.

Figure 3C:
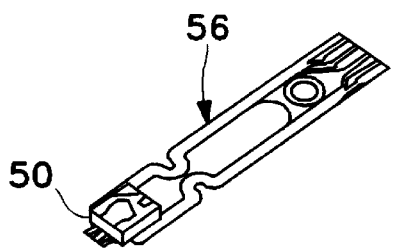

The slider 50 is then mechanically attached to the tongue portion 59 of flexible member 56 as shown in FIG. 3C. The attachment can be achieved by different methods such as ultrasonic bonding, soldering, or adhesive bonding, for example. The slider 50 is attached to the flexible member 56 such that the slider bonding pads 55 correspondingly aligned with the footprint 60 on the flexible member 56. The bonding of the bonding pads 55 to the electrical footprint 60 can be accomplished through different methods such as ball bonding, tab bonding, stitch bonding or soldering.

Prior to final assembly, the electrical properties of the magnetic head 52 need to be tested. Reference is now directed to FIG. 3D. The slider 50 which is attached to the member 56, collectively called a combination 57, is inserted into the jaws 70A and 70B of a spin tester 72. Mechanical clamping and electrical connection (not shown) between the member 56 and the spin tester 72 are provided by the jaws 70A and 70B. A load mechanism 48 having a load tip 51 is then moved toward the combination 57. The load tip 51 is then slightly landed onto the slider 50 in the combination 57. The point of landing should be where the dimple 78 (see FIG. 3G) would eventually urge the slider 50 in the final assembly. The load mechanism 48 provides the simulated load force onto the slider 50 such that a predetermined flying height of the slider 50 above surface of the disk 73 (F The disk 73 of the spin tester 72 is then spun at an angular velocity T. At this juncture, various electrical tests are conducted.

It should be noted that the flexible member 56 in this method by itself is relatively flexible and does not have a high degree of rigidity. Thus, the member 56 does not have adequate yaw stiffness by itself to withstand any high acceleration commonly encountered during track seeking in actual applications. However, the member 56 is stiff enough, and with the help of the load mechanism 48, to maintain the slider 50 at a predetermined flying height above the disk surface 73 to allow testing.

If the combination 57 fails the tests, the entire combination 57 is discarded. If the combination 57 passes the tests, the combination 57 is attached to a flexure 74, which is pre-welded onto the load beam 82, as shown in FIG. 3E. Specifically, the attachment is between the flexure tongue 76 and the flexible member tongue 59 (FIG. 3B). The attachment can be adhesive bonding or soldering, for instance. Mechanical attachment of the flexible member 56 to the flexure 74 at the proximal end 62 is optional.

To provide electrical connection to the suspension assembly 84, a flex circuit 86 is attached onto the load beam 82, as shown in FIG. 3F. The electrical pads 64 on the flexible member is soldered onto the corresponding pads (not shown) of the flex circuit 86. Instead of soldering, other attachment methods such as stitch bonding or tab bonding can also be employed. The flex circuit 86 can be securely attached to the proximal end portion 88 and the center portion 89 of the load beam 82.

Figure 3G:
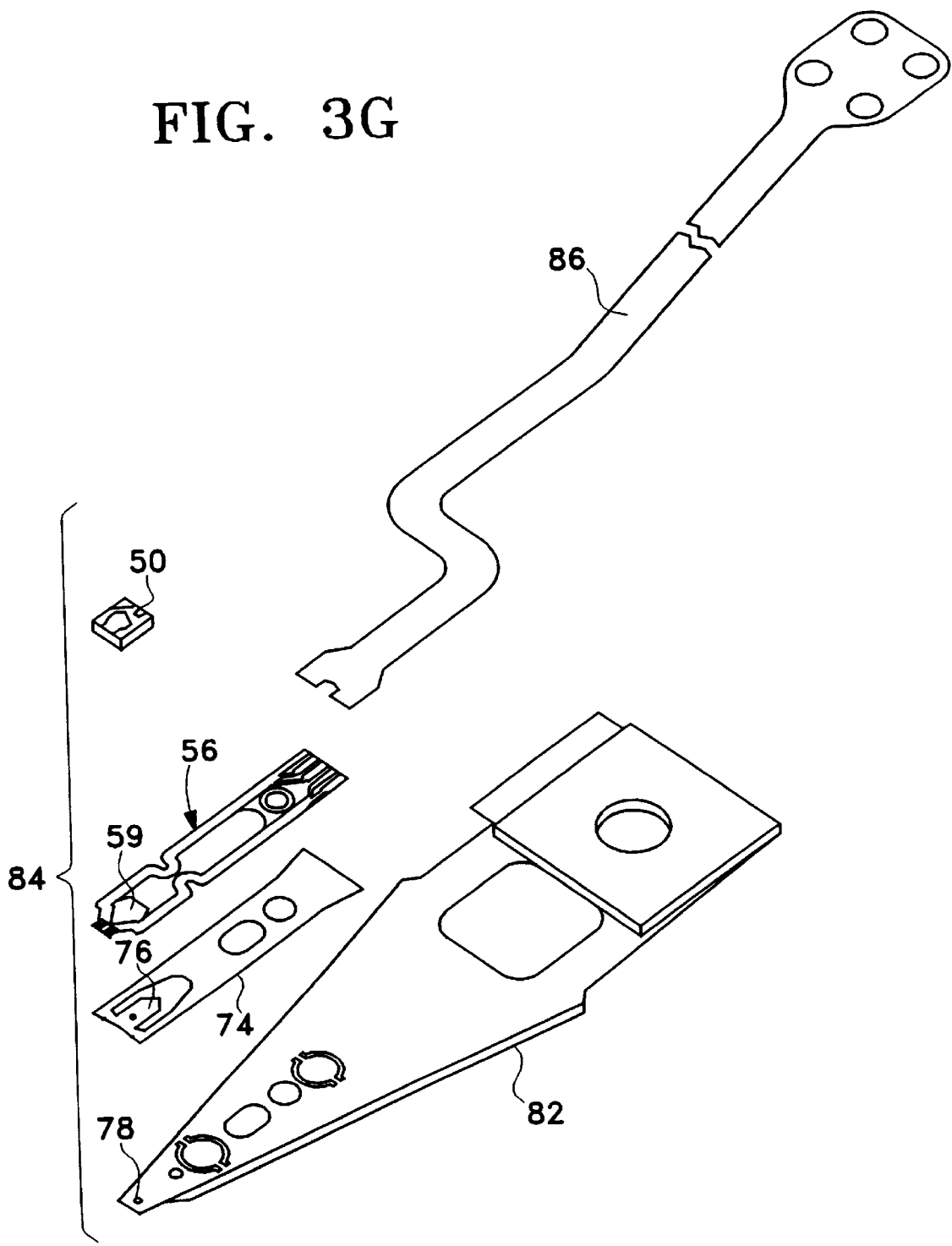
FIG. 3G is an exploded view showing the relationship of the various components of the magnetic head suspension assembly fabricated in accordance with the method show in FIGS. 3A–3F.

FIG. 3G shows an exploded view of the suspension assembly 84 illustrating the relative positions of the components in additional detail.

FIGS. 4A–4F show a second method of testing and manufacturing of a magnetic suspension assembly in accordance with the invention.

Figure 4A:
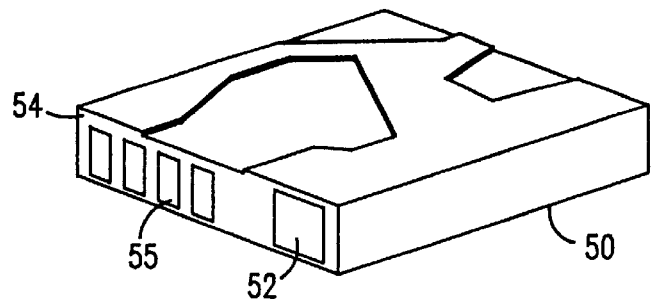
FIG. 4A–4F are sequential views showing the steps of testing and fabricating the magnetic head suspension assembly in accordance with a second method of the invention.

As with the previous method, it starts with providing a slider 50 having a magnetic head transducer 52 formed thereon as shown in FIG. 4A. The magnetic head 52 can be embedded within the slider 50 and can be an inductive head, an anistropic magnetoresistive head (AMR), a giant magnetoresistive head (GMR), or a combination thereof as a merged head. A plurality of bonding pads 55 are deposited on the trailing surface 54 of the slider 50.

Figure 4B:
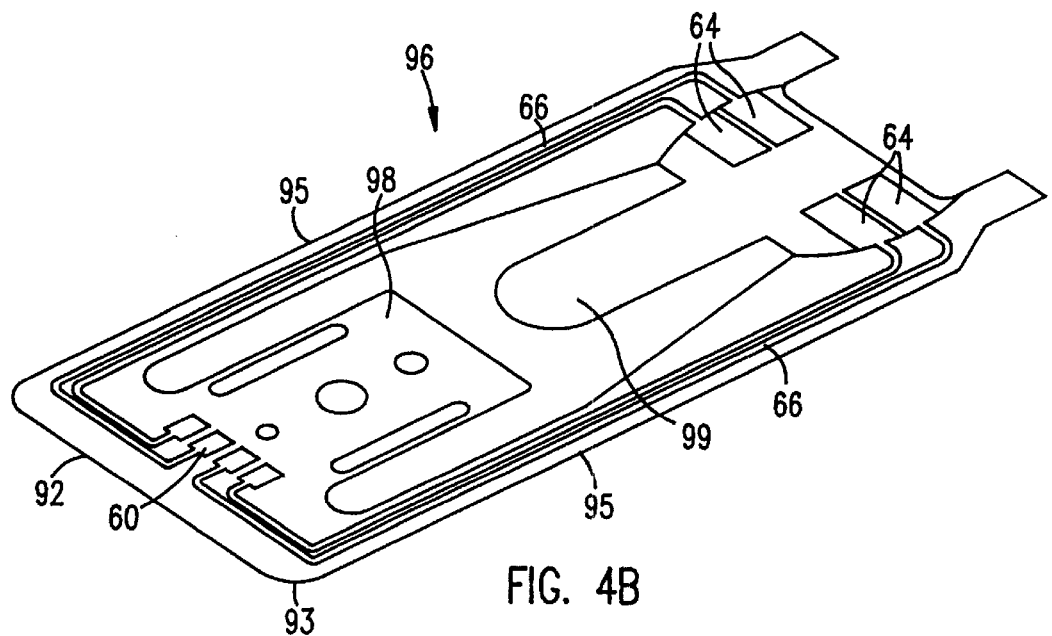

A flexible interconnect flexible member 96 is then provided as shown in FIG. 4B. For this method, the flexible member 96 has a base substrate 93 made of flexible material. Exemplary material can be polyimide or stainless steel. It should be noted that the rigidity of the flexible member 96 in this method is higher than the corresponding rigidity of the flexible member 56 shown in the previous method. The reason is that the flexible member 96 used in this method also assumes the role as a flexure in the final assembly. That is, the flexible member 96 serves the dual function of acting as an interconnect member for testing and also as a flexure in the final assembly.

Figure 4C:
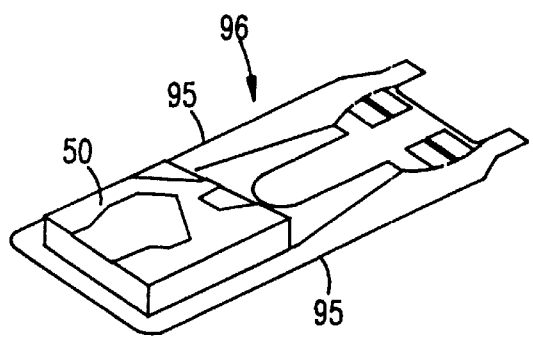

The flexure member 96 has a pair of outriggers 95. Disposed between the outriggers 95 are a first tongue 98 and a second tongue 99. Formed on the flexible member 96 at the distal end 92 is an electrical footprint 60 for receiving the slider 50. Formed on the flexible member 96 at the proximal end 62 (FIG. 3E) is a plurality of signal pads 64. The slider footprint 60 and the signal pads 64 are electrically connected through electrical traces 66 formed on the sides of the flexible member 96. Electrical traces 66 and signal pads 60 and 64 are etched from a copper sheet that is attached to substrate 93 of the flexible member 56. If the substrate 93 is made of conductive material such as steel, an insulating layer is sandwiched between the electrical traces, the signal pads 6slider 50 is then attached to the tongue 98 of the flexible member 96 as shown in FIG. 4C. The attachment can be achieved by different methods as described previously. The attachment of the slider 50 corresponds to and is in alignment with the footprint 60 of the flexible member 96. It should be noted that the slider 50 does not contact the outriggers 95 of the flexible member 96, thereby allowing the slider 50 to gimbal about the dimple 100 (FIG. 4G) during flight.

Figure 4D:
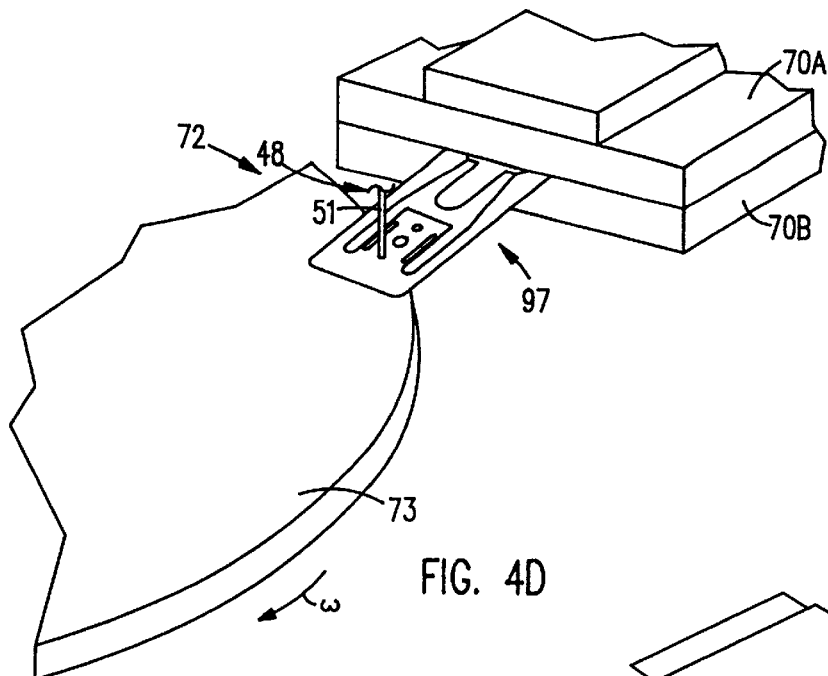

What follows is the electrical testing of the magnetic head 52. The slider 50 with the magnetic head 52 in conjunction with the flexible member 96 is collectively called a combination 97. The combination 97 is first flipped over and inserted into the jaws 70A and 70B of a spin tester 72 as shown in FIG. 4D. Mechanical clamping and electrical connection (not shown) between the flexible member 96 and the spin tester 72 are provided by the jaws 70A and 70B. A load mechanism 48 having a load tip 51 is then moved toward the combination 57. The load tip 51 is then slightly landed onto the slider 50 in the combination 97. The point of landing should be where the dimple 100 (see FIG. 4G) would eventually urge the slider 50 in the final assembly. The load mechanism 48 provides the simulated load force onto the slider 50 such that a predetermined flying height of the slider 50 above the disk surface 73 can be maintained. The disk 73 of the spin tester 72 is then spun at an angular velocity. Electrical and connectivity tests are performed on the magnetic head 52 and electrical traces 66, respectively.

If the combination 97 fails the tests, the entire combination 97 is discarded. If the combination 97 passes the tests, in this method, the combination 97 is attached directly to a load beam 82. If the flexible member 96 is made of polymeric material, attachment methods such as adhesive bonding or ultrasonic bonding can be used. If the flexible member 96 is made of metallic material, attachment methods such as adhesive bonding, soldering or welding can be employed. The areas of attachment are the second tongue 99 and the adjacent end 94 (FIG. 4E) of the flexible member 96, which areas are fixedly bonded onto the load beam 82. As mentioned before, in this method, the flexible member 96 also serves as a flexure in the final magnetic suspension assembly 104 (FIG. 4F).

Figure 4F:
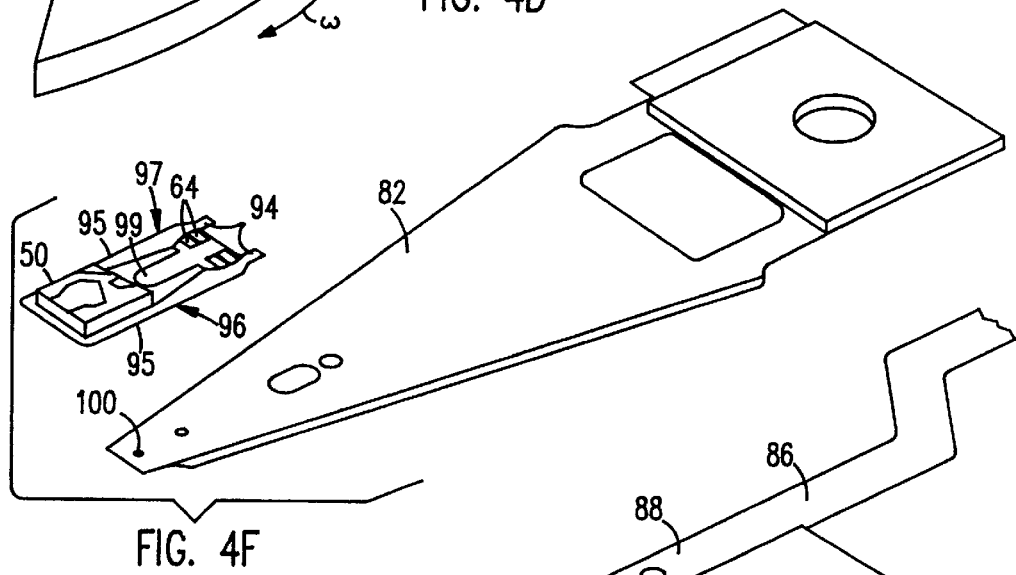
Figure 4E:
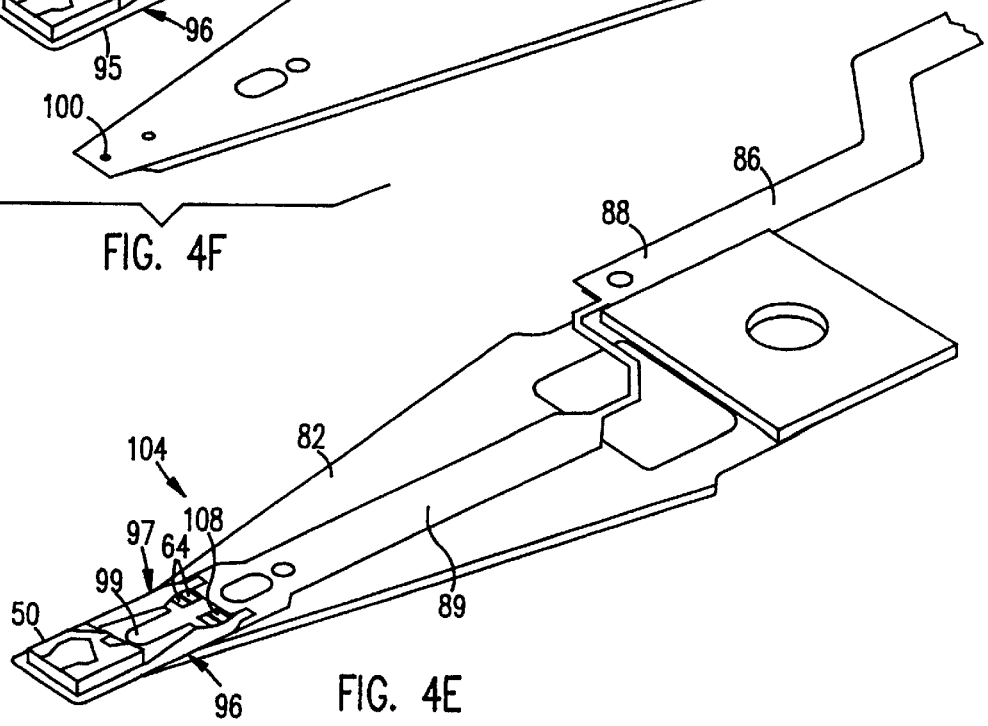

A flex circuit 86 is also attached to the load beam 82 as shown in FIG. 4F. The flex circuit 86 provides electrical connections to the flexible member 96. The flex circuit 86 can be securely attached to the proximal end 88 and the center portion 89 of the load beam 82. The electrical connection between the flex circuit 86 and the flexible member 96 can be by tab bonding of the flex circuit tabs 108 (FIG. 4H) to the signal pads 64 of the flexible member 96. Other bonding methods such as stitch bonding or reflow soldering can also be used.

FIG. 4G shows an exploded view of the suspension assembly 104 illustrating the relative positions of the components in additional detail.

Variations in shapes and materials are possible within the scope of the invention. For example, the flexible interconnect members described in the specification are made of polyimide or stainless steel. Other materials can be used as substitutes.

What is claimed is:

1. A magnetic head suspension assembly comprising:

a slider having a magnetic transducer formed thereon;

an intermediate flexible member having a mounting surface to which said slider is attached;

a load beam to which said intermediate flexible member is attached;

a flexible circuit attached to said load beam and said intermediate flexible member; and a flexure disposed between said intermediate flexible member and said load beam.

2. A magnetic head suspension assembly as in claim 1, including electrical traces formed on said intermediate flexible member.

3. A magnetic head suspension assembly as in claim 1, wherein said flexible member is formed of plastic or stainless steel.

* * * * *